US010399681B2

(12) United States Patent
Seibt et al.

(10) Patent No.: US 10,399,681 B2
(45) Date of Patent: Sep. 3, 2019

(54) SEATING ARRANGEMENT IN AN AIRCRAFT CABIN

(71) Applicant: Airbus Operations GmbH, Hamburg (DE)

(72) Inventors: Christian Seibt, Hamburg (DE); Jürgen Meister, Hamburg (DE); Ulrich Jentz, Hamburg (DE)

(73) Assignee: Airbus Operations GmbH (DE)

( * ) Notice: Subject to any disclaimer, the term of this patent is extended or adjusted under 35 U.S.C. 154(b) by 315 days.

(21) Appl. No.: 15/417,375

(22) Filed: Jan. 27, 2017

(65) Prior Publication Data

US 2017/0129612 A1     May 11, 2017

Related U.S. Application Data

(63) Continuation of application No. PCT/EP2015/066525, filed on Jul. 20, 2015.

(30) Foreign Application Priority Data

Jul. 30, 2014   (DE) ........................ 10 2014 110 820

(51) Int. Cl.
*B64D 13/00*       (2006.01)
*B64D 11/06*       (2006.01)

(52) U.S. Cl.
CPC ...... *B64D 11/0691* (2014.12); *B64D 11/0605* (2014.12)

(58) Field of Classification Search
CPC ................................................ B64D 11/0691
See application file for complete search history.

(56) References Cited

U.S. PATENT DOCUMENTS

| 4,799,632 A | 1/1989 | Baymak et al. |
| 4,913,487 A * | 4/1990 | Breckel ................ A47C 9/06 297/14 |
| 7,004,542 B2 | 2/2006 | Saint-Jalmes |

(Continued)

FOREIGN PATENT DOCUMENTS

| DE | 36 34 839 A1 | 4/1988 |
| DE | 603 00 365 T2 | 4/2006 |

(Continued)

OTHER PUBLICATIONS

DE 10 2014 110 820.5 Search Report dated Jun. 25, 2015.
International Search Report and Written Opinion PCT/EP2015/066525 (dated Sep. 8, 2015).

*Primary Examiner* — Richard G Davis
(74) *Attorney, Agent, or Firm* — Lerner, David, Littenberg, Krumholz & Mentlik, LLP

(57) ABSTRACT

A seating arrangement in a cabin of an aircraft includes a floor with a first surface area, a furnishing item with a respective boundary surface, which extends in a vertical direction from the cabin floor, and toward which is directed a first surface area, at least two folding seats, and optionally a partitioning system. The folding seats are arranged on the boundary surface of the furnishing item, and set up to be swiveled into a neutral position and use position, wherein an individual located in the first surface area can sit on the at least two folding seats in the use position. At least one of the at least two folding seats is not designed as a flight attendant seat.

13 Claims, 4 Drawing Sheets

(56) References Cited

U.S. PATENT DOCUMENTS

| | | | | |
|---|---|---|---|---|
| 2005/0087650 | A1* | 4/2005 | Quan | B64D 11/06 |
| | | | | 244/118.6 |
| 2006/0058107 | A1* | 3/2006 | Dobertin | A63H 33/008 |
| | | | | 472/92 |
| 2006/0060704 | A1* | 3/2006 | Lavie | A61G 3/001 |
| | | | | 244/118.5 |
| 2009/0261200 | A1* | 10/2009 | Saint-Jalmes | B64D 11/04 |
| | | | | 244/118.5 |
| 2010/0218225 | A1* | 8/2010 | Wilcynski | B60N 2/14 |
| | | | | 725/76 |
| 2011/0039930 | A1 | 2/2011 | Novinski et al. | |
| 2013/0234486 | A1 | 9/2013 | Duus et al. | |
| 2013/0313365 | A1* | 11/2013 | Ehlers | B64D 11/06 |
| | | | | 244/118.6 |
| 2014/0125092 | A1* | 5/2014 | Schreuder | B64D 11/00 |
| | | | | 297/163 |

FOREIGN PATENT DOCUMENTS

| | | |
|---|---|---|
| DE | 10 2010 011 704 A1 | 9/2011 |
| DE | 10 2010 046 853 A1 | 3/2012 |
| DE | 10 2013 108 121 A1 | 2/2015 |
| EP | 1934091 B1 | 3/2009 |
| EP | 2288539 B1 | 9/2013 |
| EP | 3 027 505 A1 | 6/2016 |
| FR | 2929244 A1 | 10/2009 |
| WO | 2012/080135 A1 | 6/2012 |
| WO | 2012/136327 A2 | 10/2012 |
| WO | 2014/071335 A1 | 5/2014 |
| WO | 2015014850 A1 | 2/2015 |

* cited by examiner

SEATING ARRANGEMENT IN AN AIRCRAFT CABIN

CROSS-REFERENCE TO RELATED APPLICATIONS

This application is a continuation of International Application No. PCT/EP2015/066525, filed Jul. 20, 2015, published in English, which claims priority from German Application No. 10 2014 110 820.5, filed Jul. 30, 2014, all of which are incorporated herein by reference.

FIELD OF THE INVENTION

The invention relates to a seating arrangement in the cabin of an aircraft, as well as to an aircraft with a cabin and a seating arrangement integrated therein.

BACKGROUND OF THE INVENTION

When setting up passenger cabins in transportation means, one focus lies in optimizing the space for passengers, so as to maximize the number of available seats. Consideration must here be given to seats for crewmembers, prescribed safety equipment, utilities and lavatories, which limit the available space.

Rest compartments intended in particular for use by the crew of transportation means are often realized by various dedicated systems. EP 2288539 B1 shows a rest compartment arrangement for the cabin of an aircraft with a rest compartment situated above monuments and an aisle extending from the rest compartment floor toward the monuments, wherein the monuments each comprises at least one wall that forms a recess directly above a seat area located therein, and the monuments are arranged next to each other in such a way that their recesses for accommodating the aisle are adjacent to each other, and further comprise an angled or curved shape on one or more sides that may be snugly fit against a correspondingly shaped wall of another monument, wherein the width of the wall decreases in the seat area.

EP 1934091 B1 also discloses a rest compartment system, which is arranged in a ceiling area above a passenger cabin, and comprises an aisle that extends into the cabin.

BRIEF SUMMARY OF THE INVENTION

Rest areas or Rest compartment systems can be provided on board aircraft, and require installation space that then is no longer available for other furnishing items. However, in addition to providing a rest compartment with dedicated reclining surfaces, the demand may also exist for an area or compartment for cabin crew that at least occasionally allows them to sit and rest undisturbed by passengers. As a consequence, an aspect of the invention proposes a system that is able to temporarily and optionally provide an enclosed compartment in the cabin of an aircraft.

Proposed is a seating arrangement in the cabin of an aircraft, the seating arrangement comprising a floor with at least one first surface area, at least one furnishing item having a boundary surface, which extends in a vertical direction from the cabin floor, and toward which is directed at least one first surface area, and at least two folding seats, wherein at least one of the at least two folding seats is not a flight attendant seat, wherein the at least two folding seats are arranged on the boundary surface of the at least one furnishing item, and adapted for being swiveled into a neutral position and use position, wherein a person located in the first surface area can sit on the at least two folding seats in the use position.

As a consequence, an aspect of the invention has to do in particular, but not exclusively or limitedly, with the fact that a temporary, comfortable lounge area for individuals is providable in a first surface area with equipment already in place through the smart arrangement of folding seats, which, in addition to the advantage of being able to create a private sphere, for example with a partitioning system yet to be mentioned below, also requires no additional surface areas in the cabin of the aircraft, since unused first surface areas may be associated with a new function during conventional operation.

The at least one furnishing item may be realized in a variety of ways, including in particular, but not exclusively or finally, in the form of a partition wall, a lateral wall or a cabin monument or module, such as a lavatory, a toilet, a closet, a stowage space, a separate rest compartment, a staircase or the like. The boundary surface provided for the folding seat may be permanently fixed in place or movable in design. A folding seat may be arranged on the boundary surface or integrated therein.

A folding seat must be understood as an object that has a seat surface, which is movable from an in particular vertical, i.e., folded up, neutral setting or position into a horizontal use position as needed. In the neutral setting, the folding seat should not extend into the surface area, but should rather disappear into the boundary surface in as flat, and preferably flush, a manner as possible. An ability to lock the folding seat into its neutral position is especially advantageous, so that the folding seat is prevented from automatically folding out even given turbulence and during takeoff and landing. As a result, integration into a neutral position does not disturb individuals who are working or present in an area facing the boundary surface, or passing it by, requires no additional installation space on other furnishings, and thus offers an especially space-saving option for making an additional function usable.

As a result, any cabin layout conceivable and desired by an aircraft operator can be equipped with the arrangement according to an embodiment of the invention, since the arrangement of folding seats does not impose any further restrictions on the cabin layout.

The folding seat may optionally include only one seat surface, but also a backrest and/or headrest to enhance comfort. A hinge or joint necessary for the folding seat to function between the boundary surface and seat surface may essentially run horizontally or parallel to the cabin floor. If desired, the folding seat may be automatically folded from a use position into a neutral position by means of a spring mechanism.

In addition, a flight attendant seat is usually designed as a folding seat, which is predominantly arranged on a boundary surface by means of a retaining frame. In general, an arrangement involving a flight attendant seat on a wall may be enhanced to yield a seating arrangement according to the invention by integrating an additional folding seat that need not satisfy the approval regulations for a flight attendant seat. Let it here be noted that a flight attendant seat along with its spatial arrangement in an aircraft must satisfy specific regulations in order to receive approval. For example, these involve a minimum distance from other furnishings, mechanical stability, among other things. Only approved seats that satisfy these regulations may be used as flight attendant seats. As a consequence, a folding seat described herein that is not designed as a flight attendant seat may only be used at cruising altitude or while on the ground, and cannot impede the function of a nearby flight attendant seat when in a neutral position.

In this conjunction, let it be noted that the essential elements may be used not just individually, but also in multiple embodiments. Of course, several seating arrangements according to an embodiment of the invention may be positioned in one cabin. In order to accommodate the at least one folding seat, suitable reinforcement or strengthening measures must be implemented for the boundary surface, which involve integrating reinforcing elements or load application elements, or designing the wall that provides the boundary surface as a frame structure with a visually appealing paneling and arranging the folding seat directly on the frame structure.

An advantageous embodiment comprises a partitioning system, wherein the partitioning system is adapted for being moved from a stowed position into a use position, wherein the partitioning system in the use position extends in a vertical direction from the at least one first surface area, and forms a partition wall along a defined segment on the at least one first surface area, wherein the partitioning system is adapted for being shifted over at least one edge section of the at least one first surface area when needed, so as to completely envelope the edges of the at least one first surface area.

The partitioning system must be understood as a piece of equipment that a user may move from a stowed position into a partitioning position, which creates an in particular opaque partition between two neighboring surface areas. The partitioning system extends in particular vertically from a cabin floor in the direction of a cabin ceiling, but does not have to be contiguous with the ceiling or necessarily contact the cabin floor. A partitioning system may take any form desired, ranging from flexible curtains, collapsible wall elements made out a dimensionally stable, fabric-like material that is foldable together like an accordion with essentially vertical folding axes, to rigid configurations taking the form of segmented, movably mounted partition walls, just as long as it may be ensured that the partitioning system will not obstruct a cabin area when in the stowed position.

It must be possible to reliably bring the partition wall out of its stowed position and onto the at least one edge section of the first surface area with a few manual actions. The latter must be understood as a segment or group of segments that leads to a first surface area closed on the edges via the respective accommodation of a partitioning system.

Finally, an enclosed first surface area is a surface area that is completely enveloped by walls of any kind, i.e., by the boundary surface itself, by lateral surfaces of the fuselage or other furnishings, and by the at least one partitioning system, and here provides the at least one folding seat with a temporarily enclosed room. This does not necessarily mean that all adjacent surfaces are immovable or completely enclosed. Rather, it is also conceivable and advantageous for at least one adjacent surface to be functional in nature, for example to comprise a closable access opening for a lavatory or the like, so that in addition to the function of an enclosed room, passengers on the aircraft are allowed to undisturbedly use the washing facilities.

The invention is not confined to setting up a single partitioning system. When arranging the first surface area between two cabin aisles, the invention actually also envisages the use of two partitioning systems, which run essentially parallel to the cabin aisles, and extend between two opposing furnishing items, on which folding seats are arrangeable.

In an advantageous embodiment, the arrangement comprises at least two adjacent folding seats, so that two or more individuals may be located in the temporarily enclosed room. Several folding seats may also permit use as a reclining surface for a single individual.

An especially advantageous variant comprises two opposing boundary surfaces, each of which have arranged on them at least one folding seat. Opposing may here mean that two folding seats lie diagonally across from each other, so that they are shifted toward each other roughly laterally or transversely to the seat direction. In particular, this may also mean that two boundary surfaces lie opposite each other, and are each equipped with a folding seat, but are arranged in different positions that are clearly shifted laterally relative to each other. Arranging the at least two folding seats opposite each other in such a way allows several individuals to sit in an optionally temporarily enclosed room, which may comprise a clearly smaller width than such a room with seats arranged exclusively side by side. This may make sense in particular when the fuselage width of the aircraft that is available inside only provides a very limited width for the desired temporary rest compartment, or the latter is to be situated in front of a narrow module of a cabin monument in an especially space-saving manner. It is conceivable for the temporarily enclosed room to extend to a cabin monument that comprises several adjacent toilet modules, so that only one toilet is closed off by the enclosed room, leaving a neighboring toilet available for use by passengers.

An advantageous embodiment of the seating arrangement comprises a tabletop swivel-mounted on a boundary surface, e.g., on a partition wall, a cabin monument or the like. The boundary surface preferably comprises a recess for flush mounting the tabletop, wherein the edge of the recess is provided with at least one locking means for holding the tabletop in a swiveled-back position. If necessary, a table may temporarily be provided by releasing the locking means and swiveling out the tabletop from a stowed position into a use position. The boundary surface is preferably completely flat and smooth in this stowed position. The tabletop is preferably arranged on the boundary surface so that it may swivel around a horizontal hinge line. To use the tabletop, it may be swiveled from a perpendicular position around the hinge line and into a horizontal position. In addition, it is beneficial to arrange the locking means on a side of the recess lying opposite the hinge line. As a result, a reliable retaining function may be achieved for the tabletop at a low necessary force of the locking means, for example while utilizing a largest possible distance from the hinge line. To support the tabletop, a foldable support leg may also be arranged in a position spaced apart from the hinge line, and support the tabletop in a use position. Maintaining a height of the tabletop adjusted to adjacent folding seats is advantageous for being able to comfortably work at the temporarily provided table, i.e., placing or putting something down on it.

At least one of the two folding seats may comprise a belt assembly, even if the folding seat in question is not a flight attendant seat. As a result, it is possible to temporarily fix objects in place during flight. This may also hold true for a sick individual to be separated and/or shielded from remaining passengers as much as possible, an object or a deceased individual.

In this conjunction, it must be regarded as especially advantageous for the seating arrangement to be situated in an area that also accommodates a toilet unit or lavatory, into which the surface area may extend. While transporting a patient, this ensures in particular that the sick individual will have an undisturbed stay, that helpers may care for the sick individual, and that the sick individual may easily wash up, use the bathroom or have access to other optional kinds of care.

In addition, it must be regarded as especially advantageous for the area to be an entry area in front of a door of the aircraft. In particular if the aircraft is configured as a commercial aircraft, this area usually remains open during flight, and, given the usual width of an aircraft door and corresponding width of the passage adjoining the door, comprises a suitable spatial extension that enables the integration of one or more folding seats. In addition, in particular when transporting sick or deceased individuals, the latter may be in particular separated and preferably shielded from all other passengers during their accommodation in and removal from the aircraft.

In an especially advantageous embodiment, the at least one boundary surface is formed by a partition wall. In the cabin of an aircraft, partition walls usually serve to spatially and visually border a specific functional area, for example one equipped with passenger seats, so as to provide a defined passageway.

At least about one passenger seat adjoins the side of the partition wall facing away from a folding seat. Partition walls positioned directly in back or front of a row of passenger seats may be arranged in particular in a door area, a specific distance away from a galley or toilet configuration. The partition function may be clearly expanded by integrating a folding seat.

In order to upgrade existing cabin areas that are not in continuous use, it further makes sense for the seating arrangement to comprise a monument with a boundary surface facing the at least one first surface area. In particular galley monuments, toilet monuments or combinations thereof are especially suited for this purpose. The monument may lie opposite a partition wall or some other monument. As an alternative, the partition wall may also be designed in such a way as to generate a temporarily enclosed room proceeding from a single boundary surface by giving it a U or L shaped configuration given the presence of a lateral wall of the aircraft fuselage.

In an especially advantageous embodiment, the monument may comprise a door in the boundary surface, wherein one of the at least two folding seats is integrated into the door or arranged thereon. The respective folding seat may be recessed essentially completely into the door in its stowed position, so that the space in front of the door, for example an aisle passageway, remains as free and readily traversable as possible when the partitioning system is in a stowed position. However, the folding seat may also be only partially recessed into the door or not at all when in its stowed position. In order to realize this embodiment, a structure that takes up a portion of the seat in the stowed position and/or provides a hinge may be used between the door and folding seat. Care must be taken to ensure that the force exerted on the door be as evenly distributed as possible, and also that the folding seat be sufficiently locked in place when not in use, thereby enabling an unrestricted use of the door. In a neutral setting, the folding seat gives the door a harmonious appearance. In particular, it may be very advantageous for the respective folding seat to be integrated into the door of a lavatory.

It is advantageous for at least one of the at least two folding seats to comprise a longitudinally adjustable seat surface. As a result, the most comfortable seat surface possible that also allows prolonged, comfortable sitting may be provided, even given the compact shape of the folding seat in the stowed position.

In an especially advantageous embodiment, the distance between two opposing folding seats is selected in such a way that allows an individual to lay his or her feet on an opposing folding seat while seated on one of the folding seats. In particular when combined with the longitudinally adjustable seat surface, this yields a tangible increase in comfort, without having to use any additional installation space. This also improves the transport of sick or deceased individuals.

In an especially preferred embodiment, at least one of the at least two folding seats is a flight attendant seat. As a consequence, the additional weight owing to the integration of the seating arrangement according to the invention in particular into an aircraft is markedly reduced, since an already existing seat only performs an additional function.

The invention further relates to an aircraft with an aircraft fuselage, at least one cabin and at least one seating arrangement positioned therein and described above.

BRIEF DESCRIPTION OF THE DRAWINGS

Additional features, advantages and possible application options of the present invention may be gleaned from the following description of the exemplary embodiments and the figures. All described and/or graphically depicted features here constitute the subject matter of the invention whether taken individually or in any combination, even independently of their composition in the individual claims or back references thereto.

DETAILED DESCRIPTION

Figure 1:
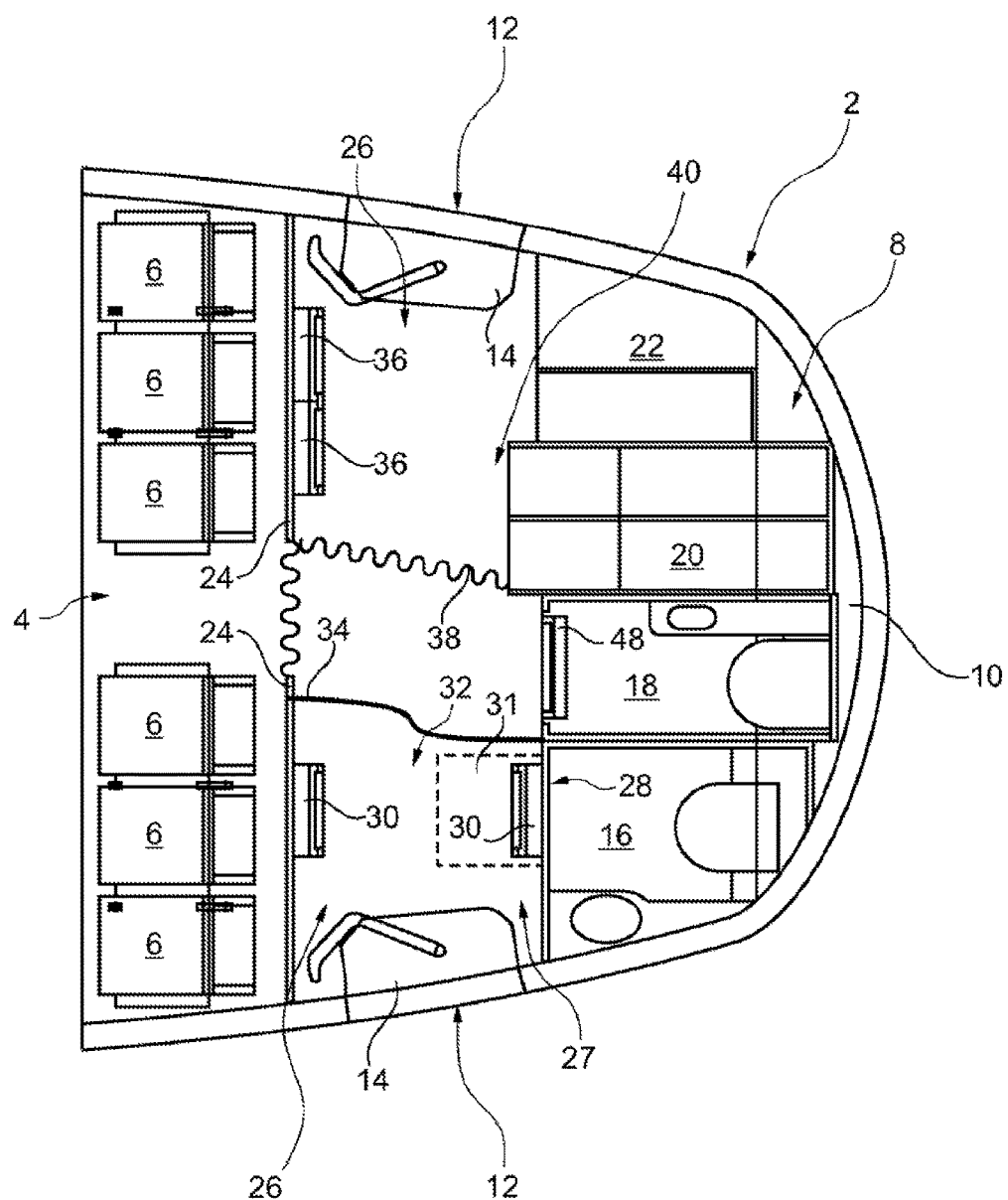
FIGS. 1 to 4 each show a seating arrangement having a different structural design.

FIG. 1 shows a rear view 2 of an aircraft, in which is situated a cabin 4 having several passenger seats 6 and a cabin monument 8 comprised of several modules, which directly borders a pressure bulkhead 10. The aircraft has several doors 12 for entering the cabin 4, of which two are situated opposite each other in the depicted rear section 2. The doors 12 exemplarily comprise an emergency escape chute assembly 14, which is situated on the door and extends into the cabin 4.

The cabin monument 8 exemplarily comprises two toilet modules 16 and 18, wherein the toilet module 16 is arranged on an exterior side of the fuselage, and because of the round pressure bulkhead 10 has less of a depth extension than the more inwardly lying, adjacent toilet module 18. Several galley modules 20 and 22 are arranged on an extension running toward the opposing side, and provide stowage space for trolleys and/or electrical devices, as well as stowage space for smaller objects.

Situated adjacent to the passenger seats 6 are partition walls 24, which together with the modules 16, 18, 20 and 22 each keep a door area 26 clear as an exemplary first surface area. The latter is not used during normal flight, and comprises a seating arrangement 27 according to the invention.

According to the invention, the toilet module 16 in this depiction comprises a door 28 with a folding seat 30 arranged thereon. This folding seat is directly integrated into the door 28, for example, and is usable in such a way that an individual may sit down on this folding seat, and is here oriented toward the opposing partition wall 24. The latter has secured to it another folding seat 30, for example, which is placed on the partition wall 24. Each of the door 28 and partition wall 24 thus comprises a boundary surface, respectively, for a temporary lounge area 32, which is closed off by the door 12 and an additional curtain 34 as the partitioning system.

The special advantage to this arrangement lies in the fact that a rather small, temporarily enclosed room 32 is providable that does not expand beyond essentially half the width of the cabin monument 8, but rather temporarily blocks an outer toilet module 16, and in particular provides only a single toilet module 18 when the passengers are in rest phases. While the basic functionality of the cabin monument 8 is not limited due to the low toilet usage during these quieter flight phases, an additional lounge area may simultaneously be created without wasting any installation space inside the aircraft whatsoever.

For example, the folding seat 30 arranged in the door 28 may be an already existing flight attendant seat integrated into the door 28. The latter would be sufficient for providing the lounge area 32, so that the curtain 34 would be the only retrofit necessary to provide the area 32. If a folding seat 30 is not present at an opposing location, the latter may be enhanced by a folding seat that does not necessarily have to be designed as a flight attendant seat, but rather may also comprise a markedly simpler design, and would not have to be approved as a flight attendant seat. Should it be necessary to find a flight attendant seat, the latter would already be ready for the individual seated on the folding seat 30 at another location inside the aircraft. The folding seat and flight attendant seat may also be positioned in reverse order. Regulations relating to the integration of a flight attendant seat opposite the direction of flight are less strict than those relating to integration in the direction of flight.

For the sake of completeness, let it be noted that two flight attendant seats 36 may be arranged on the opposing side in the other door area 26, which may also be situated in a conventional, temporarily enclosed room 40 as the result of a partitioning system 38.

In order to put down objects or perform work, it is further possible for a folding table 31, for example one that is integrated in the door 28, but that may also be arranged in a recess in the partition wall 24 or other furnishings, to be swiveled around a vertical stowed position into a horizontal use position. This is illustrated on FIG. 1 by a dashed rectangle, which is in no way to be interpreted as a limitation, but only as a schematic indication.

Figure 2:
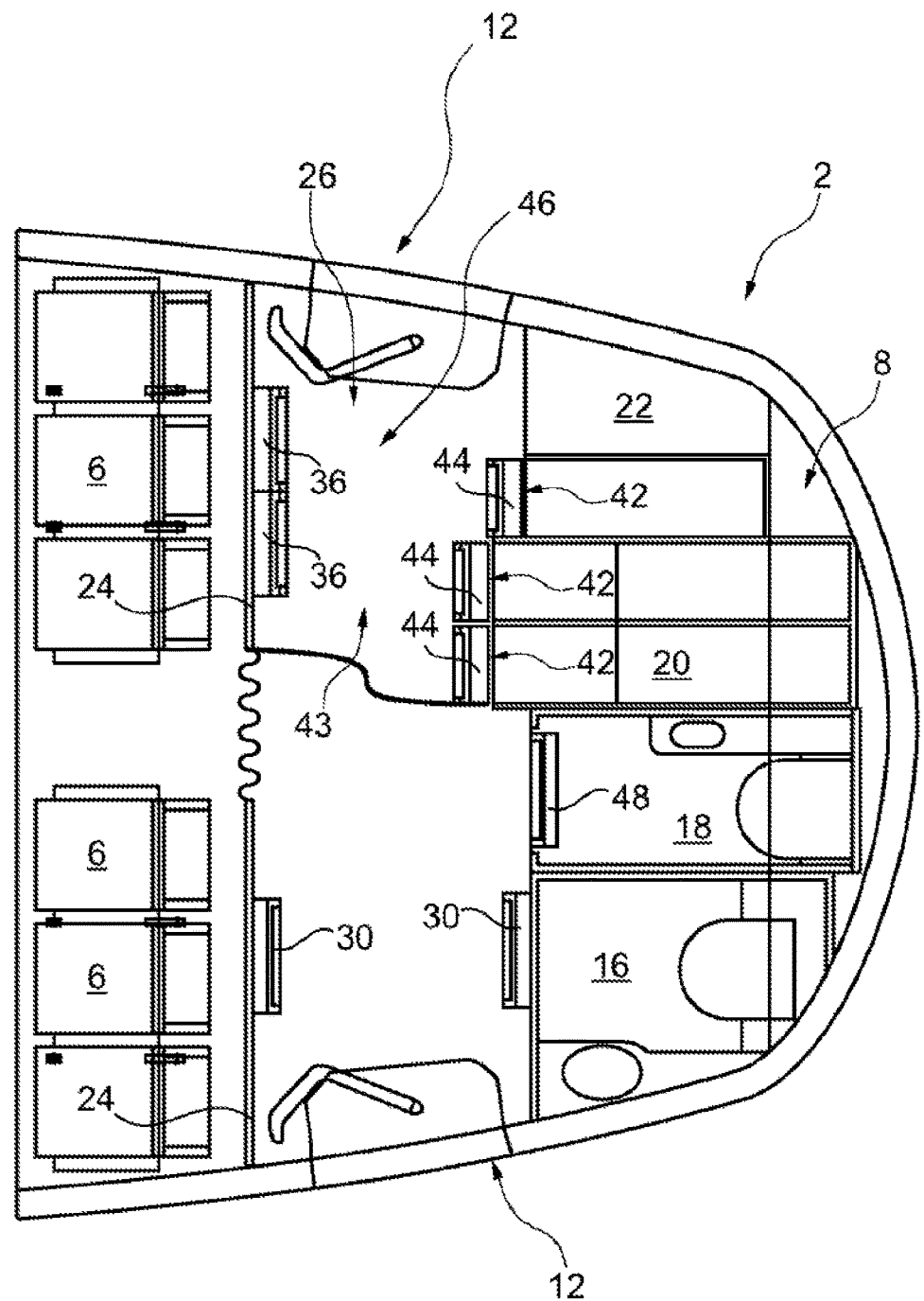

As shown on FIG. 2, the principle according to the invention may also be carried over to the temporarily enclosed room 40 from FIG. 1. For example, the modules 20 and 22 may comprise trolley parking spaces, which is closable with doors 42. Additional folding seats 44 could be arranged on or in these doors 42, which result in a group of five seats 44 or 36 in all in a temporarily enclosed room 46, thereby yielding a seating arrangement.

The flight attendant seats 48 and 30 shown on FIG. 2 are usable in a conventional way.

Figure 3:
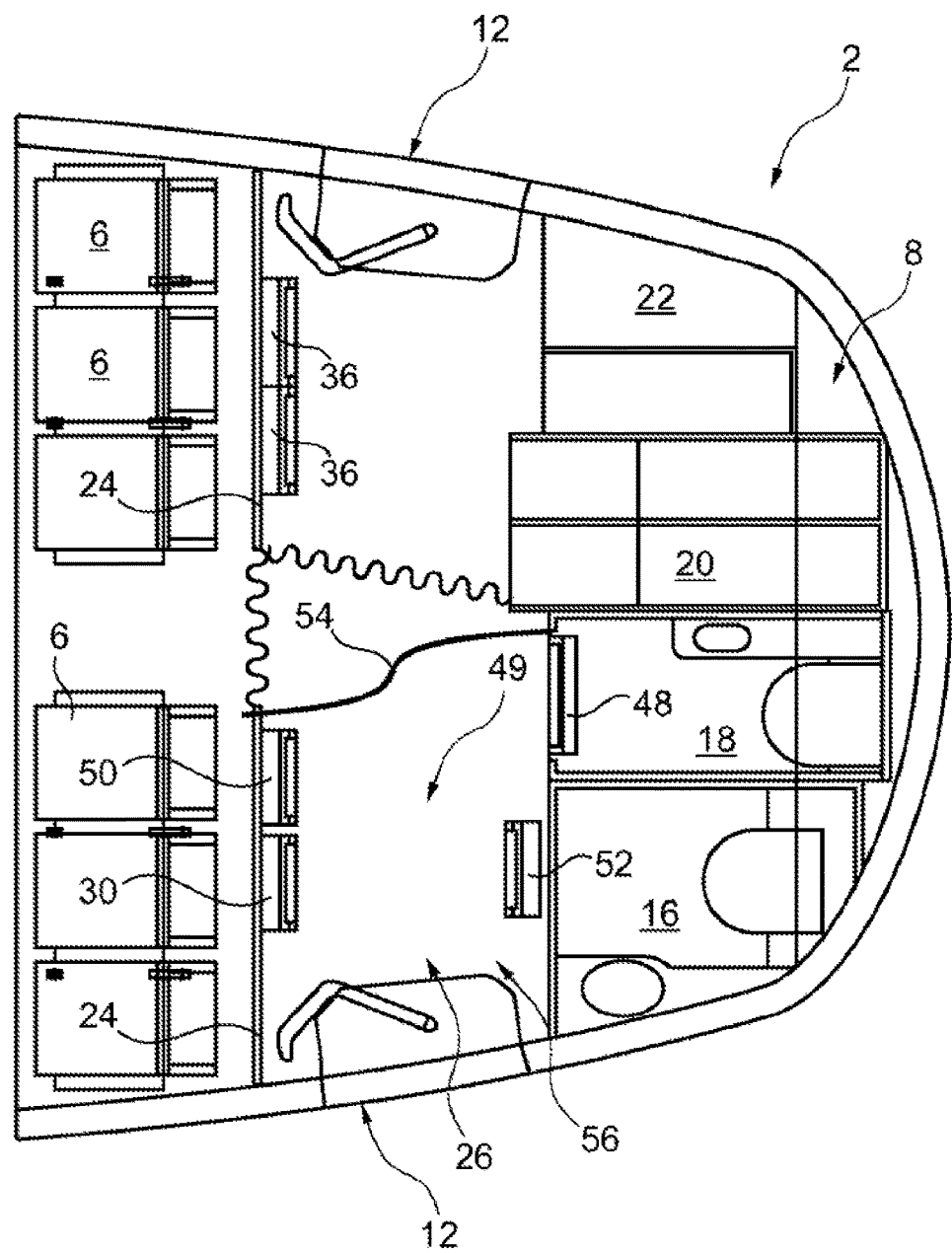

FIG. 3 shows another alternative in the form of a seating arrangement 49, in which the flight attendant seats 30 and 48 are present as on FIG. 2. In addition, another folding seat 50 and 52 is respectively arranged next to the flight attendant seat 48 or 30. In conjunction with a partitioning system 54 designed as a curtain, this yields a relatively large, temporarily enclosed room 56, in which four individuals may stay, and which encloses the two toilet modules 16 and 18.

Figure 4:
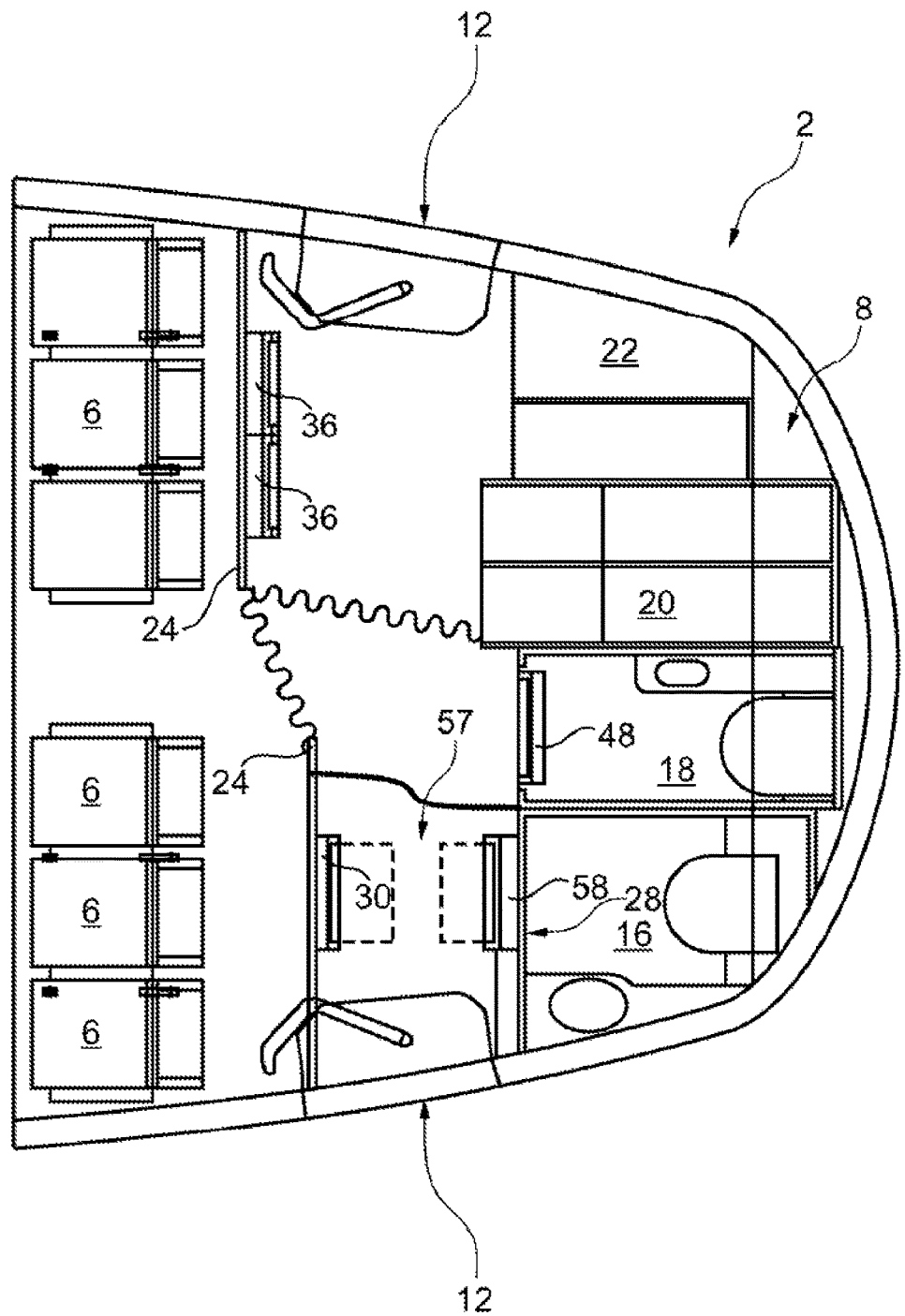

Finally, FIG. 4 shows another variant with a seating arrangement 57, in which the respective door area 12 is relatively narrow in design, meaning that the distance between a partition wall 24 located in the lower drawing plane and the toilet modules 16 and 18 is markedly smaller than on the other FIGS. 1 to 3. More space may be provided for the passenger seats 6 for this purpose, or more seats 6 may be integrated into the cabin. When a flight attendant seat 30 is integrated on or in the partition wall and a folding seat 58 is integrated on or in the door 28 of the toilet module 16, the distance between the two seats 30 and 58 is so small that both may together be used by one individual. For example, one individual may sit on the flight attendant seat 30 and rest his or her legs on the additional seat 58. This provides a very comfortable stay to an individual while only blocking the outer toilet module 16.

In conclusion, let it be noted that the position of the seating arrangement inside the aircraft must not be construed as limiting. Such a seating arrangement may be integrated next to a door area, in front of, in back of, next to or between cabin monuments, which also include partition walls, in dedicated passageway areas or in completely different locations inside the cabin.

In addition, let it be noted that "comprising" does not preclude any other elements or steps, and that "an" or "a" does not rule out a plurality. Let it further be noted that features or steps that were described with reference to one of the above exemplary embodiments can also be used in combination with other features or steps in other exemplary embodiments described above. Reference numbers in the claims are not to be regarded as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A seating arrangement in a cabin of an aircraft, comprising:
 a floor having at least one first surface area;
 at least a first furnishing item with a first boundary surface, extending in a vertical direction from the cabin floor and a second furnishing item with a second boundary surface extending in the vertical direction from the cabin floor, each of the first and second boundary surfaces defining a boundary of the at least one first surface area, wherein at least one of the first and second boundary surfaces comprises a door; and
 at least two folding seats,
 wherein the at least two folding seats are arranged on one of the first and second boundary surfaces, and are configured to be selectively swiveled into one of a neutral position and a use position, wherein an individual located in the first surface area can sit on at least one of the at least two folding seats in the use position,
 wherein one of the at least two folding seats is arranged on each of the first and second boundary surfaces,
 wherein one of the at least two folding seats is integrated into the door or arranged thereon, and wherein at least one of the at least two folding seats is not a flight attendant seat.

2. The seating arrangement according to claim 1, further comprising at least one partitioning system,
wherein the partitioning system is configured to be moved from a stowed position into a use position, wherein the partitioning system in the use position extends in a vertical direction from the at least one first surface area, and forms a partition wall along a defined segment on the at least one first surface area.

3. The seating arrangement according to claim 1, wherein the at least two folding seats comprise at least two adjacent folding seats.

4. The seating arrangement according to claim 1, wherein the at least one first surface area is an entry area in front of a door in a fuselage of the aircraft.

5. The seating arrangement according to claim 1, wherein the first boundary surface is formed by a partition wall.

6. The seating arrangement according to claim 5, wherein at least one passenger seat adjoins the side of the partition wall facing away from one of the at least two folding seats.

7. The seating arrangement according to claim 1, further comprising a monument having a third boundary surface facing the at least one first surface area.

8. The seating arrangement according to claim 1, wherein at least one of the at least two folding seats comprises an adjustable seat surface.

9. The seating arrangement according to claim 1, wherein a distance between two of the at least two folding seats is selected in such a way that allows an individual to lay his or her feet on an opposing folding seat while seated on one of the at least two folding seats.

10. The seating arrangement according to claim 1, wherein at least one of the at least two folding seats is a flight attendant seat.

11. The seating arrangement according to claim 1, further comprising a tabletop swivel-mounted on one of the first and second boundary surfaces.

12. An aircraft comprising a fuselage, at least one cabin formed in the fuselage, as well as at least one seating arrangement according to claim 1.

13. The aircraft according to claim 12, wherein the seating arrangement is arranged in a door area.

* * * * *